(12) United States Patent
Vason et al.

(10) Patent No.: US 11,578,295 B2
(45) Date of Patent: Feb. 14, 2023

(54) PROCESS FOR THE PROTEIN STABILISATION OF AN OENOLOGICAL LIQUID

(71) Applicant: JU.CLA.S.—S.R.L., Settimo di Pescantina (IT)

(72) Inventors: Albano Vason, San Pietro in Cariano (IT); Marco Adolfo Marconi, Fosse di Sant'Anna D'Alfaedo (IT); Alessandro Angilella, Sant'Ambrogio di Valpolicella (IT); Francesco Lonardi, San Pietro in Cariano (IT)

(73) Assignee: JU.CLA.S.—S.R.L., Settimo di Pescantina (IT)

( * ) Notice: Subject to any disclaimer, the term of this patent is extended or adjusted under 35 U.S.C. 154(b) by 598 days.

(21) Appl. No.: 16/484,503

(22) PCT Filed: Feb. 8, 2018

(86) PCT No.: PCT/IB2018/050780
§ 371 (c)(1),
(2) Date: Aug. 8, 2019

(87) PCT Pub. No.: WO2018/146610
PCT Pub. Date: Aug. 16, 2018

(65) Prior Publication Data
US 2020/0308518 A1 Oct. 1, 2020

(30) Foreign Application Priority Data
Feb. 8, 2017 (IT) .................. 102017000013909

(51) Int. Cl.
*C12H 1/16* (2006.01)
*C12G 1/022* (2006.01)
*C12H 1/14* (2006.01)

(52) U.S. Cl.
CPC ............ *C12H 1/16* (2013.01); *C12G 1/0203* (2013.01); *C12H 1/14* (2013.01); *C12G 2200/15* (2013.01)

(58) Field of Classification Search
CPC . C12H 1/16; C12H 1/165; C12G 1/00; C12G 1/02; C12G 1/0203; C12G 1/0206;
(Continued)

(56) References Cited

U.S. PATENT DOCUMENTS

2003/0165592 A1* 9/2003 Sun ................ C12H 1/003
426/12
2015/0184117 A1* 7/2015 Stites ................ C12H 1/165
426/244

FOREIGN PATENT DOCUMENTS

CN 86106408 5/1988
CN 1632097 6/2005
(Continued)

*Primary Examiner* — Vera Stulii
(74) *Attorney, Agent, or Firm* — Mark M. Friedman

(57) ABSTRACT

Process for the protein stabilization of an oenological liquid, comprising a step of preparation of an oenological liquid (3) containing proteins, a step of application of at least one pulsed electric field to the oenological liquid (3), followed by a step of introducing at least one protease into the oenological liquid (3), a hydrolysis step, in which the protease catalyses the breakage of at least one peptide bond between the amino group and the carboxyl group of the proteins present in the oenological liquid (3), thereby forming compounds (7) containing the amino and/or carboxyl groups; such hydrolysis step transforms the oenological liquid (3) into a stabilised oenological liquid (5).

6 Claims, 2 Drawing Sheets

(58) Field of Classification Search
CPC ...... C12G 1/0209; C12G 1/0213; C12G 1/06; C12G 1/062
See application file for complete search history.

(56) References Cited

FOREIGN PATENT DOCUMENTS

| | | |
|---|---|---|
| CN | 201506786 | 6/2010 |
| WO | 03074649 | 9/2003 |

* cited by examiner

PROCESS FOR THE PROTEIN STABILISATION OF AN OENOLOGICAL LIQUID

FIELD OF APPLICATION

The present invention regards a process for the protein stabilization of an oenological liquid, as well as a plant for the protein stabilization of an oenological liquid in particular operating by means of the aforesaid process, according to the preamble of the respective independent claims.

The present process for the protein stabilization it intended to be advantageously used in the food field, and in particular in the oenological field for the clarification of the must or for the refining and improvement of its characteristics due to the at least partial elimination of components present in solution in excessive concentrations, e.g. unstable proteins, which can lead to a turbidity of the wine.

The present plant for the protein stabilization therefore has optimal use in the oenological field of industrial wine production.

STATE OF THE ART

In the oenological field, the problem of forming semi-solid deposits inside the containers of oenological liquids has been known for some time; for example, this occurs inside wine bottles following even slight thermal shocks. Such semi-solid deposits are innocuous from the standpoint of the consumer's health but nevertheless they are visually unpleasant and make the product less appealing and harder to sell.

Normally, such problem is resolved by means of the previous elimination of the particles contained in the oenological liquid which can flocculate following thermal shocks and form the aforesaid semi-solid deposits.

The elimination, or at least the reduction, of the components in solution inside an oenological liquid (clarification, in the technical jargon of the field), in particular in wine or a precursor thereof, e.g. a must, has been extensively confronted in the field of production of oenological liquids and over time multiple clarification processes and plants have been implemented.

As is known, wine is a uniform mixture (solution) mainly composed of water, alcohol, acids, polyphenols, proteins and sugars. The proteins present in the wine can be substantially divided into stable proteins and unstable proteins based on their capacity to remain in solution with the variation of the environmental conditions, e.g. following a thermal shock.

The unstable proteins are normally thermolabile proteins, i.e. proteins which are incapable of maintaining their solubility constant with the variation of the temperature of the solution in which they are present.

More clearly, thermolabile proteins, following the exposure to a heat source or following the stay in a particularly cold environment, can reach critical temperature values (in particular from −3 to 4° C. for 5-10 days or at 70-80° C. for 1-3 hours, or 30° C. for months) and sustain a denaturing, i.e. an irreversible modification of their spatial structure. Consequently, they lose their attractive capacity with regard to the solvent in which they are dissolved and they become colloids that can easily precipitate, in particular if in the presence of other organic colloids (e.g. tannins) or metallic colloids (e.g. $Fe^{3+}$). In this situation, the proteins precipitate or more correctly flocculate, forming a protein deposit which in the technical jargon of the field is termed "protein casse" and is substantially constituted by small amorphous granules which give rise to a turbidity of the wine that makes it poorly appealing in the eyes of a potential consumer.

As is known, especially in white wines, the unstable proteins also withstand the steps of the vinification process of fermentation and refining, and therefore they remain in the finished win and bottled. Consequently, such unstable proteins can be subjected to flocculation and precipitation inside the bottle following the intervention of an instability factor, such as a thermal shock, forming an unpleasant layer of protein casse at the bottom of the bottle.

In order to remove the unstable proteins present in the enological liquids before the wine is bottled and sold, a process has for some time been known for the clarification, which initially provides for a step of introducing, inside the oenological liquid, at least one clarifying substance, i.e. a material usable in order to make the proteins contained in the oenological liquid more quickly precipitate (flocculate), and then to clarify the oenological liquid itself, e.g. a must or a wine, by means of subsequent filtration step.

In particular, clarifying substances of organic origin are known in the oenological field, such as egg albumin, gelatin, serum albumin and casein. Inorganic clarifying substances, of rocky origin, are also known in the oenological field, such as bentonite gel and silica dioxide.

Subsequently, the process of known type provides for the step of filtration of the oenological liquid in order to separate the protein deposit from the liquid, thus obtaining a clarified product.

The process for the protein stabilization of known type described briefly above has in practice shown that it does not lack drawbacks.

A first drawback lies in the fact that the insertion of external clarifying substances can worsen the final organoleptic properties of the wine, i.e. of the wine sold to the consumer, which is therefore less appealing to the expert appraisers.

A further drawback lies in the fact that the step of introducing of such substances often provides for the combined use of bentonite gel, an argillaceous mineral, whose composition is termed "molecular cage". This particular type of composition acts as a molecular filter, i.e. it retains and precipitates all the substances that it encounters and which are provided with a specific spatial size.

Therefore, once inserted in an oenological liquid, bentonite tends to precipitate many organic substances that will then be subsequently removed in the aforesaid filtration step.

More in detail, bentonite traps and precipitates many of the proteins present in the oenological liquid without distinction between stable proteins and unstable proteins. In addition, bentonite also precipitates many other stable organic substances, which do not require being removed. In this situation, following the step of introducing the clarifying substance, the oenological liquid results impoverished, lacking organic substances or proteins which are instead appreciated in the finished product and which would not require any treatment.

Also known from the patent WO 03074649 is a process of protein stabilization of an oenological liquid, which provides for a step of adding a protease to the oenological liquid. Such process however was not particularly effective.

Known from the patents CN 1632097, CN 201506786 and CN 86106408 are processes for treating an oenological liquid through the use of electric fields, in particular for accelerating the aging thereof, which however are not used for the protein stabilization.

PRESENTATION OF THE INVENTION

In this situation, the task underlying the present invention is to eliminate the drawbacks of the abovementioned prior art, by providing a process for the protein stabilization of an oenological liquid and a plant for the protein stabilization of an oenological liquid which allow ensuring an optimal clarity for the oenological liquid itself.

Another object of the present finding is to provide a process for the protein stabilization of an oenological liquid that does not considerably modify the organoleptic qualities of the same oenological liquid.

Another object of the present finding is to provide a process for the protein stabilization of an oenological liquid which is inexpensive and easy to achieve.

Another object of the present finding is to provide a plant for the protein stabilization of an oenological liquid which is easy to install.

Another object of the present finding is to provide a plant for the protein stabilization of an oenological liquid which is easy to use.

Another object of the present finding is to provide a plant for the protein stabilization of an oenological liquid which structurally simple and entirely reliable in operation.

BRIEF DESCRIPTION OF THE DRAWINGS

The technical characteristics of the finding, according to the aforesaid objects, can be clearly seen from the contents of the below-reported claims and the advantages thereof will be more evident in the following detailed description, made with reference to the enclosed drawings, which represent a merely exemplifying and non-limiting embodiment of the invention, in which

DETAILED DESCRIPTION OF A PREFERRED EMBODIMENT

Figure 1:
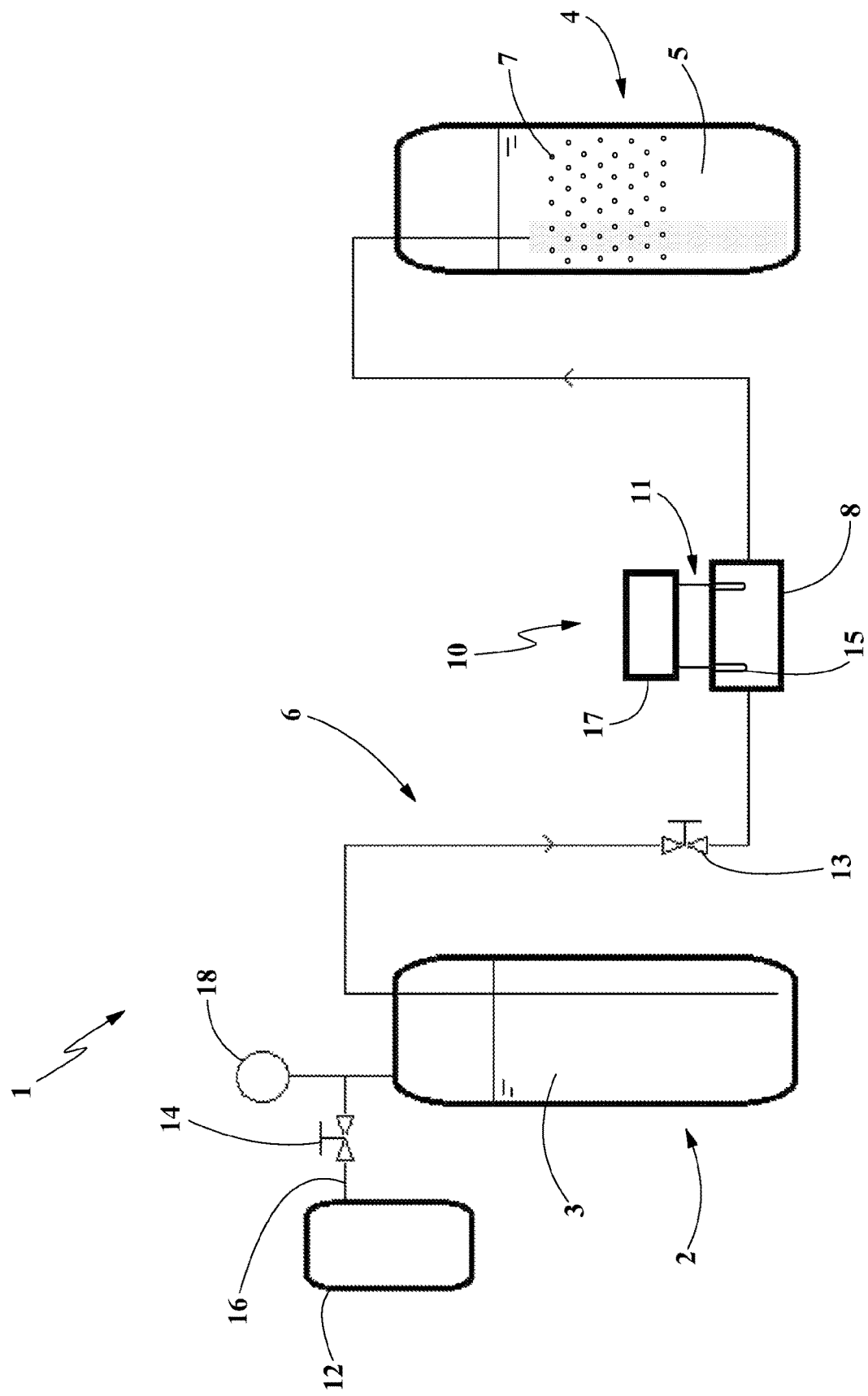
FIG. 1 shows a logical-functional diagram of the plant for the protein stabilization of an oenological liquid, object of the present finding.

With reference to the enclosed FIGURE, reference number 1 overall indicates the plant for the protein stabilization of an oenological liquid, object of the present invention, operating by means of a process for the protein stabilization of an oenological liquid, also the object of the present invention.

Such plant 1 and such process are intended to be used in general in the food industry, and in particular in the oenological industry, in order to treat any type of oenological liquids. Hereinbelow, for the sake of simplicity, reference will only be made to the case of an oenological product such as wine or must to be clarified, it being nevertheless intended that the use of such plant and the relative process for the protein stabilization can also be associated with intermediate oenological liquids that lie between grape must and wine, without departing from the protective scope of the present patent.

The process for the protein stabilization, object of the present invention, initially comprises a step of preparation of an oenological liquid 3 containing a concentration of unstable proteins.

Preferably, the oenological liquid 3 comprises grape must that is not yet fermented, which has not undergone other processes for its clarification and has not sustained thermal shocks, so as to avoid negatively affecting the organoleptic properties of the oenological liquid 3.

More in detail, the grape must of the oenological liquid 3 is composed of a uniform mixture comprising water, alcohol, acids, polyphenols, sugars and the aforesaid concentration of unstable proteins.

More in detail, each protein is, as is per se known, provided with a molecular chain formed by a plurality of amino acids, each of which comprises an amino functional group and a carboxyl functional group. Each amino group of each amino acid is bonded to the carboxyl group of at least one adjacent amino acid along the molecular chain by means of a covalent peptide bond, which maintains the two amino acids bonded together in order to form such molecular chain.

The protein concentration contained in the oenological liquid 3 is normally dissolved in the latter or dispersed in a uniform manner, therefore forming a substantially uniform mixture (solution).

In the initial step of the process of preparation of the oenological liquid 3 (e.g. in a first tank 2 indicated hereinbelow), the latter lacks precipitations, since the proteins dissolved therein have not sustained thermal shocks and are found in solution in a situation of stability. Such step in fact corresponds with the initial preparation of the grape must.

According to the idea underlying the present invention, the process for the protein stabilization of the oenological liquid comprises a step of application of at least one pulsed electric field to the oenological liquid 3.

Such step of application of a pulsed electric field involves an interaction between the electric field lines and the amino acids that constitute the proteins dispersed in the oenological liquid 3, which respond to the field pulses, tending to align themselves along the field lines.

In this situation, the electrostatic energy stored along the field lines of the pulsed electric field acts on the proteins, weakening the force of the peptide bond present between the amino group and the carboxyl group of at least two adjacent amino acids along the aforesaid protein molecular chain.

Due to the basicity of the amino group and the acidity of the carboxyl group, each amino acid has a bipolarity of electric charge but a total electric charge equal to zero. In this situation, the chain of amino acids is sensitive to the electrostatic attraction imparted by the pulsed electric field, due to the spatial distance between the negative charge of the carboxylic groups and the positive charge of the amino groups, in fact assuming the shape of an electric dipole.

In other words, the protein concentration of the oenological liquid 3 oscillates in the attempt to align itself in the variable orientations of the pulsed electric field, mechanically stressing the proteins themselves.

By virtue of the above-described mechanism for weakening the bonds of the proteins stressed by the attempt to align themselves in the variable orientations of the pulsed electric field, it can be easily understood that different values of intensity and frequency of pulsed electric field can be used, which in particular depend on the type of wine or on the proteins present in the wine, without departing from the protective scope of the present patent.

The technical effect of weakening (which is then exploited by the protease, explained hereinbelow) takes place due to the presence of the pulsed electric field as is and, considering the proteins of the wine, it is more easily obtainable through a pulsed electric field comprised between 5 and 120 kV/cm and with a frequency comprised between 300 and 1000 Hz.

Preferably, the pulsed electric field of the application step is nevertheless comprised between 20 and 40 kV/cm and in particular comprised between 30 and 35 kV/cm and pulse with a frequency comprised between 300 and 700 Hz and in particular comprised between 400 and 600 Hz.

Preferably the step of application of the pulsed electric field takes place with continuous passage of a wine flow through two electrodes, advantageously in a manner so as to subject the wine to the aforesaid pulsed electric field for a time comprised between 0.1 microseconds and 5 seconds.

The process for the protein stabilization of the oenological liquid, object of the present invention, also comprises a step of introducing at least one protease in the oenological liquid 3.

Preferably, the step of introducing the protease follows the step of application of the pulsed electric field.

With the term protease it must be intended hereinbelow any one enzyme capable of catalyzing the breakage of the peptide bond between the amino group and the carboxyl group of the proteins, in particular between two adjacent amino acids, as described more in detail hereinbelow.

The process for the protein stabilization of an oenological liquid subsequently provides for a hydrolysis step, in which the protease introduced in the oenological liquid during the step of introducing catalyzes the breakage of at least one peptide bond between the amino group and the carboxyl group of the proteins of the protein concentration in the oenological liquid 3, thereby forming compounds 7 containing the amino and carboxyl groups, in particular containing the amino acids that formed part of the protein concentration.

Surprisingly, the optimal effects experimentally found regarding the protein stabilization in the wine lead to the consideration that protease facilitates the breakage of the aforesaid peptide bond, since such bond was weakened following the step of application of the pulsed electric field, and in particular it facilitates the breakage thereof by means of the use of at least one water molecule (hydrolysis).

In operation, the hydrolysis of the covalent peptide bond that is formed between the amino acids of a protein is not a spontaneous reaction and requires a high activation energy, which is provided by the synergy of the aforesaid mechanical stress actuated by the energy stored along the field lines during the step of application of a pulsed electric field and by the action of the protease during the step of introducing at least one protease. The hydrolysis step transforms the oenological liquid 3 into a stabilized oenological liquid 5.

More in detail, the compounds 7 formed during the hydrolysis step contain organic compounds comprising an amino and carboxylic group. Each compound 7 comprises at least one amino acid, which is an electrically neutral molecule overall even if having the aforesaid electric bipolarity, composed of electric charges located at the two amino and carboxylic functional groups. Such molecules that compose the compounds 7 are therefore lighter than the proteins and are provided with an electric polarity. Hence, they are highly soluble in water, which is a well-known polar solvent that retains them in solution of the aforesaid electrostatic force.

Following the hydrolysis step, the compounds 7 are solutes uniformly dissolved inside the oenological liquid 3, which is chemically stable, obtaining a stabilized oenological liquid 5.

In this situation, the stabilized oenological liquid 5, even following possible thermal stresses, will remain limpid, without the risk of flocculation of unstable proteins, in particular of thermolabile proteins, since they were broken up during the hydrolysis step and are found in solution, firmly retained in the water that acts as polar solvent.

Advantageously, the process for the protein stabilization of an oenological liquid, object of the present invention, are drastically reducing the risk of deformation of protein deposits following thermal shocks, without impoverishing the oenological liquid, preserving the organoleptic characteristics thereof.

In accordance with a first embodiment of the process, object of the present invention, the protease introduced into the oenological liquid 3 during the introduction step remains in solution together with the compounds 7 and does not allow the amino acids to be reconstituted to once again form potentially unstable proteins, drastically decreasing the risk of flocculation, conferring the desired limpidity to the stabilized oenological liquid 5 which is not negatively affected following possible thermal shocks.

Advantageously, the process for the protein stabilization of an oenological liquid also comprises a step of filtrating the stabilized oenological liquid 5, obtaining a clarified oenological liquid.

Preferably, the filtration step is obtained by means of at least one filtration with a tangential filter, which is well-known to the man skilled in the art and therefore will not be described in detail hereinbelow.

Otherwise, in accordance with a second embodiment of the process, object of the present invention, the step of introducing at least one protease provides for the introduction, inside the oenological liquid 3, of at least one support, on which the aforesaid protease is applied in a substantially irremovable manner, such that it is not dispersed in the oenological liquid 3.

Preferably, the support is made of a resinous material and is susceptible of being moved between a work position in which it is immersed, during the introduction step, in the oenological liquid 3, and a rest position in which it is extracted from the oenological liquid 3 following the hydrolysis step.

During the hydrolysis step, the aforesaid protease applied in an irremovable manner to the support performs its catalyzing action for the breakage of the peptide bonds of the proteins, without being dispersed in the oenological liquid 3. Therefore, once the support is moved from the work position to the rest position following the hydrolysis step, the proteases integral with the support are extracted from the stabilized oenological liquid 5 together with the support.

In accordance with the preferred embodiment of the present invention, the step of preparation of the oenological liquid 3 takes place in a first tank 2, in particular with grape must.

Preferably, following the step of preparation of the oenological liquid 3, the process for the protein stabilization provides for a transfer step for the oenological liquid 3 from the first tank 2 to a second tank 4 by means of at least one first conduit 6, which is intercepted by generation means for a pulsed electric field 10 in order to carry out the step of application of the pulsed electric field during the transfer step.

Advantageously, the step of introducing the protease takes place in the second tank 4, on the oenological liquid 3 which has passed through the conduit 6 and has been subjected to the step of application of the pulsed electric field.

Figure 2:
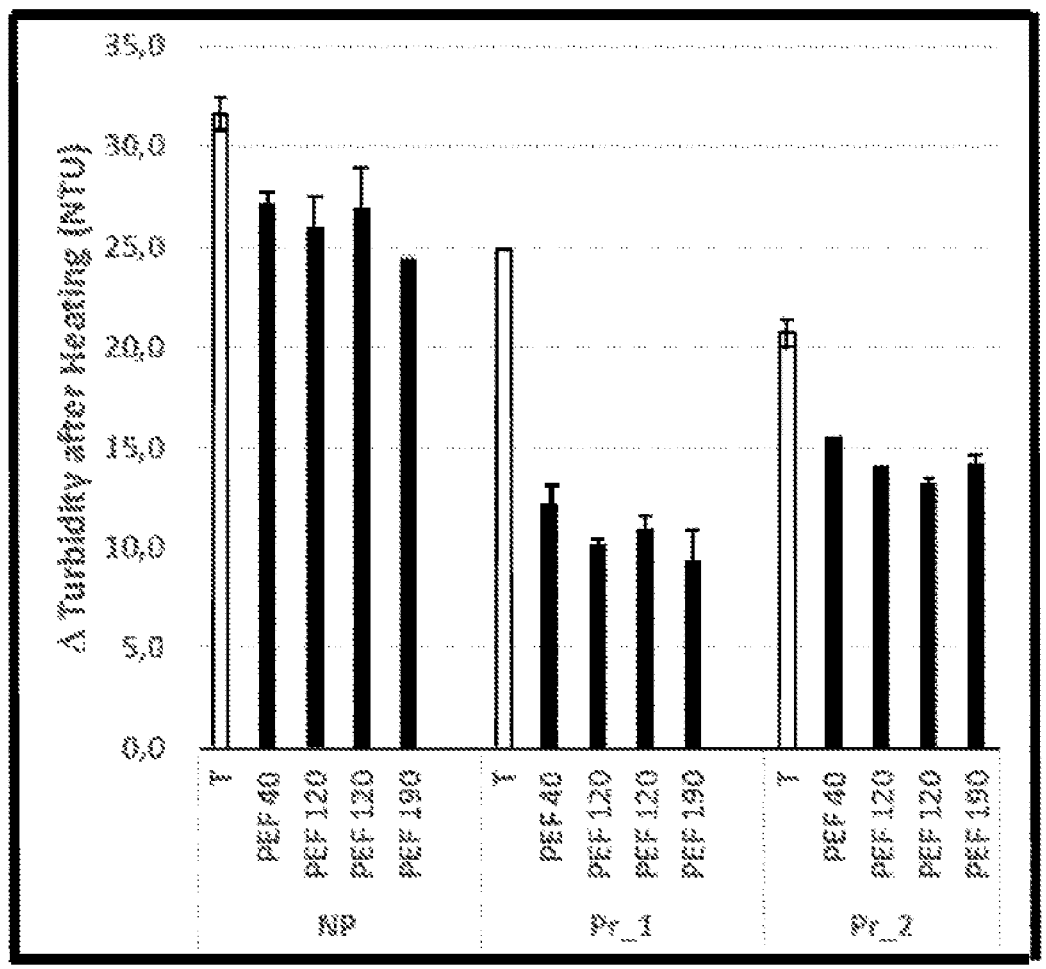

For the purpose of empirically testing the aforesaid synergy between the effect of the pulsed electric field and the catalyzing effect of the protease, the applicant conducted several experimental tests, whose results are summarized in FIG. 2.

More in detail, FIG. 2 reports (on the y-axis) the variation of nephelometric turbidity units ($\Delta NTU$) measured by means of a turbidimeter following a test under hot conditions, for several samples of grape must (on the x-axis). In operation, the hot test provides that a plurality of samples of grape must, treated by means of the aforesaid step of application of a pulsed electric field and by means of the aforesaid step of introducing at least one protease, is then brought to the temperature of 80° C. for two hours. Subsequently, the grape must samples are cooled in an ice bath for another two hours.

Following such thermal shock, the thermolabile proteins contained in each grape must sample denature and flocculate, increasing the turbidity value, measured by the turbidimeter in NTU.

As can be clearly seen in FIG. 2, the grape must sample to which a pulsed electric field of 30 kV/cm was applied with frequency of 400 Hz, pulse length of 12 μs and intensity of 190 kJ/kg (PEF 190 in FIG. 2) and in which a first protease (Pr_1 in FIG. 2) has been introduced, following the aforesaid thermal shock, had a reduction of the level of turbidity of 22.2 NTU with respect to the untreated sample (T-NP). The most significant result is however the reduction of the level of turbidity with respect to the sample which was only subjected to the step of introducing the first protease (T-Pr_1), equal to 15.5 NTU.

The level of turbidity of each must sample was also measured following only the step of application of the pulsed electric field, and a substantially variation of the level of turbidity following the aforesaid hot test was not found with respect to the untreated sample (T).

Therefore, the experimental tests demonstrate the synergy between pulsed electric field and protease, which is shown by means of a considerable decrease of the turbidity of the oenological liquid following a thermal shock and therefore a considerable increase of the protein stability.

The above-described process is advantageously attained by means of a plant for the protein stabilization of an oenological liquid, as described hereinbelow.

The plant for the protein stabilization of an oenological liquid, object of the present invention, comprises a first tank 2 for containing an oenological liquid 3, a second tank 4 intended to contain stabilized oenological liquid 5 and at least one conduit 6 adapted to hydraulically connect the first tank 2 and the second tank 4 for transferring the oenological liquid 3 from the first tank 2 to the second tank 4.

Preferably, the process for the stabilization of an oenological liquid and the plant for the stabilization of an oenological liquid, object of the present invention, operate by means of the initial preparation of unfermented grape must that has not sustained substantial thermal shocks.

According to the idea underlying the present invention, the plant 1 for the protein stabilization of an oenological liquid also comprises generation means for generating a pulsed electric field 10 associated with the first conduit 6 and susceptible of acting on the oenological liquid 3 transiting from the first tank 2 to the second tank 4.

In accordance with the preferred embodiment of the present invention illustrated in the enclosed FIG. 1, the plant 1 for the protein stabilization of an oenological liquid, object of the present invention, comprises a third tank 12 intended to contain a pressurized gas and placed in flow connection with the first tank 2 by means of at least one second conduit 16.

Advantageously, the third tank 12 of the plant 1 is susceptible of insufflating the pressurized gas to the interior of the first tank 2 in order to push the oenological liquid 3 to cross through the first conduit 6.

Preferably, the plant 1 also comprises first adjustment means 13 placed to intercept the first conduit 6 in order to adjust the flow of said oenological liquid 3 and second adjustment means 14 placed to intercept the second conduit 16 in order to adjust the flow of the pressurized gas.

Advantageously, the generation means for a pulsed electric field 10 comprise a voltage source 17 and at least one electrode 15 placed to intercept the first conduit 6 and electrically connected to the source 17 by means of at least one connection cable 11.

Preferably, the voltage source 17 comprises a PWM modulated electronic inverter adapted to convert the voltage of an electrical distribution grid into a required pulsed voltage.

In accordance with the preferred embodiment of the plant 1, object of the present invention, the generation means for a pulsed electric field 10 comprise two electrodes 15 electrically connected to the voltage source 17 by means of two respective connection cables 11 placed to intercept the first conduit 6.

More in detail, the two electrodes 15 are preferably housed inside an operating chamber 8 placed to intercept the first conduit 6 and within which a work volume is defined intended to be traversed by the oenological liquid 3, in order to apply the desired pulsed electric field on the latter.

In operation, when the plant 1 is placed in operation, the oenological liquid 3 is forced to traverse the first conduit 6 from the first tank 2 towards the second tank 4, crossing through the work volume of the operating chamber 8 of the generation means for a pulsed electric field 10.

In accordance with the preferred embodiment illustrated in the enclosed FIG. 1, the first adjustment means 13 comprise at least one first valve 13 placed to intercept the first conduit 6 and movable between a first open position in which it frees the first conduit 6 for the passage of the oenological liquid 3, and a first closed position in which it obstructs the first conduit 6 in order to block the passage of the oenological liquid 3 from the first tank 2 towards the second tank 4.

Advantageously, the second adjustment means 14 comprise at least one second valve placed to intercept the second conduit 16. Such second valve is movable between a second open position in which it frees the second conduit 16 in order to allow the passage of the pressurized gas, and a second closed position in which it obstructs the second conduit 16 in order to block the passage of the pressurized gas contained in the third tank 12. The second valve can therefore be actuated in order to free the flow of the pressurized gas contained inside the third tank 12, and convey it inside the second conduit 16 towards the first tank 2.

In this situation, when the second valve of the second adjustment means 14 is moved into the aforesaid first open position, the pressurized gas enters inside the first tank 2 and increases the internal pressure thereof.

Advantageously, in order to avoid risks of over-pressure, the internal pressure of the first tank 2 is constantly monitored by means of a barometer 18 housed at a containment wall of the first tank 2 itself and placed in flow connection both with the pressurized gas contained in the third tank 12, and with the oenological liquid 3 contained in the first tank 2.

Once a specific threshold value inside the tank 2 has been reached, the oenological liquid 3 exits from the latter by crossing the first conduit 6, towards the second tank 4, thrust by the pressurized gas.

Advantageously, the first valve of the first adjustment means 13 and the second valve of the second adjustment means 14 are movable with precision into a plurality of intermediate positions between the aforesaid first and second open position and first and second closed position, in order to obtain a fine adjustment of the fluid flow that crosses them.

In this manner, by means of the movement of the first valve placed to intercept the first conduit 6, it is possible to finely adjust the flow rate of oenological liquid 3 that flows from the first tank 2 towards the second tank 4, and consequently adjust the quantity of oenological liquid 3 that is introduced inside the operating chamber 8.

In addition, by means of the movement of the second valve placed to intercept the second conduit 16, it is possible to finely adjust the flow rate of pressurized gas that flows inside the first tank 2, and consequently adjust the velocity with which the oenological liquid 3 is forced to exit from the first tank 2 itself.

In operation, the voltage source 17 of the generation means for a pulsed electric field can be controlled in order to generate a voltage pulse train, each voltage pulse provided with the desired amplitude and duration (e.g. 30 kV at 400 Hz). Such pulse train is transmitted to the electrodes 15 through the respective connection cables 11 in order to generate a corresponding pulsed electric field between the two electrodes 15 themselves.

In this situation, when the voltage source 17 is controlled to generate such voltage pulse train, inside the operating chamber 8 the two electrodes 15 apply the corresponding pulsed electric field to the oenological liquid 3 in order to weaken the peptide bonds of the amino acids that constitute the proteins of the concentration of the oenological liquid 3 itself.

The finding thus conceived therefore attains the pre-established objects.

In particular, the process for the protein stabilization of an oenological liquid, object of the present invention, allows drastically reducing the risk of formation of protein deposits following thermal shocks, without impoverishing the oenological liquid, preserving its organoleptic characteristics.

The invention claimed is:

1. A process for the protein stabilization of an oenological liquid, comprising:
   preparing an oenological liquid containing a concentration of unstable proteins; wherein said oenological liquid is grape must or wine;
   applying a pulsed electric field to said oenological liquid, wherein electrostatic energy stored along field lines of the pulsed electric field acts on said proteins, weakening the force of at least one peptide bond present between an amino group and a carboxyl group of at least two adjacent amino acids along a protein molecular chain of said proteins;
   introducing at least one protease in said oenological liquid, after the applying said pulsed electric field;
   carrying out hydrolysis, wherein said at least one protease catalyzes the breakage of at least one peptide bond between an amino group and a carboxyl group of the proteins of said protein concentration in said oenological liquid, thereby forming compounds containing said amino and carboxyl groups, so that said oenological liquid is transformed into a stabilized oenological liquid.

2. The process of claim 1, wherein the pulsed electric field is comprised between 5 and 120 kV/cm and with a repetition frequency comprised between 300 and 1000 Hz.

3. The process of claim 1, wherein introducing at least one protease provides for the introduction, into said oenological liquid, of at least one support on which said at least one protease is applied in a substantially irremovable manner.

4. The process of claim 1, wherein preparing said oenological liquid takes place in a first tank;
   the method further comprising
   transferring said oenological liquid from said first tank to a second tank by means of at least a first conduit, which is intercepted by generation means generating said pulsed electric field;
   wherein said at least one protease is introduced in said second tank on said oenological liquid which has passed through said conduit and has been subjected to said pulsed electric field.

5. The process of claim 1, wherein said pulsed electric field is applied to a continuous passage of a wine flow through two electrodes.

6. The process claim 1, wherein said continuous passage of a wine flow through two electrodes subjects said liquid to said pulsed electric field for a time comprised between 0.1 microseconds and 5 seconds.

* * * * *